Aug. 27, 1940.  A. LAUFFER  2,212,782

SELF-STARTING SYNCHRONOUS MOTOR

Filed July 19, 1939

Inventor,
A. Lauffer
by: Glascock Downing & Seebold
Attys.

UNITED STATES PATENT OFFICE 2,212,782

SELF-STARTING SYNCHRONOUS MOTOR

Andreas Lauffer, Schwenningen-on-the-Neckar, Germany

Application July 19, 1939, Serial No. 285,424
In Germany July 28, 1938

5 Claims. (Cl. 172—278)

This invention relates to small self-starting, single-phase synchronous motors, more particularly for driving clocks or the like, in which in a known manner for enabling the unpolarised rotor to start there are provided next to the main poles additional auxiliary poles, the magnetic flux of which is phase-displaced with respect to the main poles by a short-circuit winding. For obtaining low speed the number of poles of the stator is made fairly high. Finding space for the large number of poles close to one another presents difficulties however and results in complications in the assembling of the stator laminations which have to be given a great number of offsets.

In the small synchronous motor according to the present invention the halves of the stator consist each of two plates, one for the main poles and one for the auxiliary poles, connected to the ends of the core of the excitation coil. According to the invention the plates of one stator half contain in a circular opening the plates lying in the same plane of the other stator half. The main and auxiliary poles are bent over, in each case from one plate of the stator halves, in such a manner that the ring of main poles and the ring of auxiliary poles are disposed on two cylindrical surfaces, one of which embraces the other. In this construction, even in a motor of the smallest dimensions, there is space for any number of poles, the parts of the stator consisting of simple plates, out of which the pole teeth are bent over with a single bend. As all the auxiliary poles lie on the same cylindrical surface, they can be loaded by a common short-circuiting ring. The rotor which is of annular shape may rotate between the rings of poles or inside or outside them. For obtaining a greater torque it may have a plurality of annular parts which rotate inside, between or outside the rings of poles. This arrangement does not enlarge the overall dimensions of the motor. The plates forming the internally disposed half of the stator may carry the bearing for the rotor. In order further to reduce the dimensions, the free ends of the teeth of the outer ring of poles may be bent over into the cylindrical surface of the inner ring of poles.

Several constructional examples of the invention are illustrated in the accompanying drawing, in which Fig. 1 represents a motor in elevation, the rotor being removed.

Figure 1:
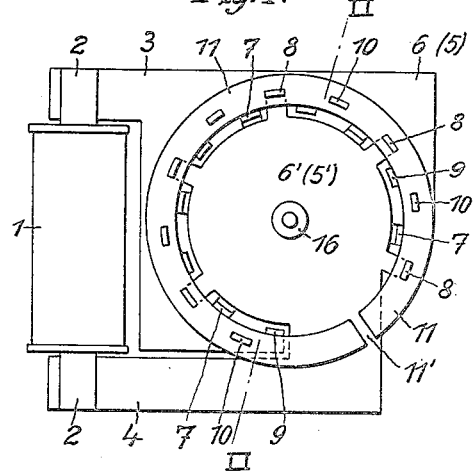

The two halves 3 and 4 of the stator are connected to the core 2 of the excitation coil 1. The two halves of the stator are disposed in one plane, the plates of one half being cut out in circular form in such a manner that they embrace the plates of the other stator half. Each half of the stator consists of two superposed plates 5, 6 and 5', 6' respectively, of which the plates 5 and 5' form the main poles and the plates 6 and 6' form the auxiliary poles. The plates might be still further subdivided, so as to reduce the iron losses. The formation of the poles from a single plate, however, has the advantage of greater simplicity and stability of the poles. A further subdivision also involves the danger of the occurrence of noise at the poles. All the stator plates have projecting pole pieces which are bent over once at right angles, so that all the auxiliary poles and all the main poles in each case lie on a cylindrical surface. Thus from the stator plate 5 the main poles 9 and from the stator plate 5' the other main poles 7 are bent over. From the stator plate 6 the auxiliary poles 10 and from the stator plate 6' the auxiliary poles 8 are bent over.

In order to give the auxiliary poles a magnetic flux which is phase-displaced with respect to the main poles, they are provided with an additional winding, for instance a short-circuiting ring. In the arrangement according to the invention a metal ring 11 common to all the auxiliary poles may however be applied in a very simple manner, which ring has corresponding openings, through which the auxiliary poles extend. The main poles of course extend past the ring 11. The ring is not closed, but has a slot 11' for the purpose of preventing any uncontrollable eddy currents.

The rotor 12 may be made pot-shaped or ring-shaped. In any case it has an annular part 13, the diameter of which is such that it will rotate either inside or outside or between the two rings of poles. The rotor may be made completely smooth and is preferably made of hardened, but not magnetised steel. Consequently it will act during starting as a Ferraris disc, while during operation poles are formed in a known manner, as if the rotor were polarised. For obtaining a particularly high torque, it may be provided at one face with serrations.

Figure 2:
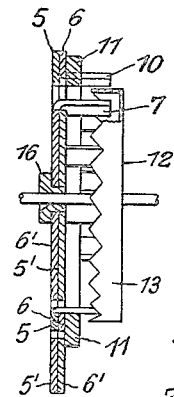
Fig. 2 shows a section of this example on line II—II of Fig. 1.
Figure 5:
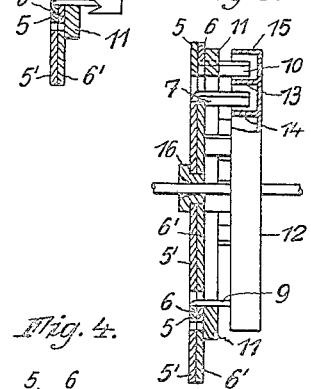
Fig. 5 shows a motor according to Fig. 2 in section, with a modified form of rotor.
Figure 3:
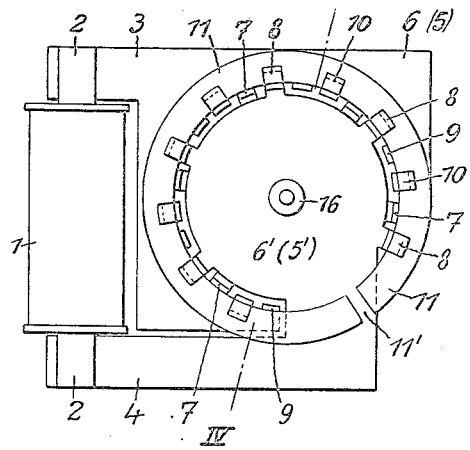
Fig. 3 is an elevational view of another example.

The strongest starting torque is of course obtained when the rotor rotates between the two rings of poles. The torque can however be further increased, by giving the rotor several annular parts, of which one rotates between the rings of poles and the other annular part of annular parts inside or/and outside the ring of poles. A constructional example with three annular parts is shown in Fig. 5. The construction of this motor is for the rest the same as that shown in Figs. 1 and 2. The rotor however has three concentric annular parts 13, 14 and 15, of which the middle annular part 13 rotates between the two rings of poles, the inner annular part 14 rotates inside the poles and the part 15 rotates outside the ring of poles.

Figure 4:
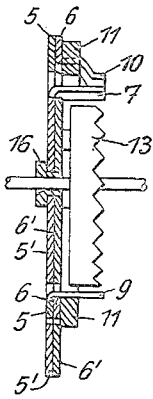
Fig. 4 is a sectional view taken on the line IV—IV of Fig. 3.

A particularly flat form of construction of the motor results, when the rotor rotates only inside the ring of poles, as shown in Fig. 4. With the pole pieces constructed as in Figs. 1 and 2, the auxiliary poles would be at a fairly great distance from the rotor and could thus only produce a weak starting torque. Thus it is preferable, in the construction of the rotor in a manner as shown in Fig. 4, for the auxiliary poles 8 and 10 to be bent over in such a manner that they extend into the same cylindrical surface as the main poles 7 and 9.

The internally disposed stator half 4, which consists of the plates 5' and 6', may at the same time support the bearing 16 for the rotor.

What I claim is:

1. A self-starting single-phase synchronous motor comprising in combination a core, an excitation coil on said core, a rotor, a stator having a plurality of main poles and auxiliary poles and consisting of two halves each composed of two plates, the plates of one stator half being connected to one end of said core and the plates of the other stator half to the other end of the core, the plates of one stator half having an opening for containing the plates of the other stator half in the same plane, main poles formed by a ring of teeth bent out of the plane of one plate of each stator half, and the auxiliary poles formed by a ring of teeth bent out of the plane of the other plate of each stator half in such a manner that the ring of main poles and the ring of auxiliary poles are disposed on two cylindrical surfaces one of which embraces the other.

2. A motor as claimed in claim 1 and comprising a common ring-shaped short-circuiting element surrounding the teeth of the ring of auxiliary poles.

3. A motor as claimed in claim 1 and in which the rotor has an annular part for rotating between the two rings of poles.

4. A motor as claimed in claim 1 and in which the free ends of the teeth of the outer pole ring are bent inwards into the cylindrical surface of the inner pole ring.

5. A motor as claimed in claim 1 and in which the inner half of the stator forms the bearing for the rotor.

ANDREAS LAUFFER.